United States Patent [19]

Gardner-Clayson et al.

[11] Patent Number: 5,558,755
[45] Date of Patent: Sep. 24, 1996

[54] METHOD FOR REMOVING CONTAMINANTS FROM AN AQUEOUS MEDIUM

[75] Inventors: Thomas Gardner-Clayson, Buffalo; Patrick J. Filey, Amherst, both of N.Y.

[73] Assignee: Recra Environmental, Inc., Amherst, N.Y.

[21] Appl. No.: 219,701

[22] Filed: Mar. 28, 1994

Related U.S. Application Data

[62] Division of Ser. No. 882,341, May 13, 1992, Pat. No. 5,372,690.

[51] Int. Cl.$^6$ .................................................. C02F 1/46
[52] U.S. Cl. .......................... 205/753; 204/571; 205/754
[58] Field of Search ................................. 204/149, 186, 204/150, 151, 152, 571; 205/753, 754

[56] References Cited

U.S. PATENT DOCUMENTS

| | | | |
|---|---|---|---|
| 2,130,789 | 9/1938 | Campbell | 205/25 |
| 3,766,034 | 10/1973 | Veltman | 204/149 |
| 3,919,062 | 11/1975 | Lundquist, Jr. et al. | 204/149 |
| 3,988,221 | 10/1976 | Garrett et al. | 204/105 R |
| 4,004,994 | 1/1977 | Andrus | 205/753 |
| 4,014,766 | 3/1977 | Watanabe et al. | 205/754 X |
| 4,048,030 | 9/1977 | Miller | 204/149 |
| 4,053,378 | 10/1977 | Moeglich et al. | 204/149 |
| 4,072,596 | 2/1978 | Moeglich | 204/241 |
| 4,094,755 | 6/1978 | Moeglich | 204/149 |
| 4,123,345 | 10/1978 | Shettel | 204/275 |
| 4,131,526 | 12/1978 | Moeglich | 204/149 |
| 4,176,038 | 11/1979 | Moeglich | 204/277 |
| 4,240,886 | 12/1980 | Hodges et al. | 204/112 |
| 4,269,689 | 5/1981 | Agladze et al. | 204/268 |
| 4,329,211 | 5/1982 | Plantes et al. | 204/149 |
| 4,351,734 | 9/1982 | Kauffman | 210/748 |
| 4,383,901 | 5/1983 | Smith et al. | 205/754 X |
| 4,517,067 | 5/1985 | Byerley et al. | 204/255 |
| 4,828,667 | 5/1989 | Silvestri et al. | 204/255 |
| 5,133,873 | 7/1992 | Catlin et al. | 205/754 X |

FOREIGN PATENT DOCUMENTS

| | | |
|---|---|---|
| 0341614 | 5/1989 | European Pat. Off. . |
| 3723745 | 9/1988 | Germany . |

OTHER PUBLICATIONS

"An Electrochemical Way of Stripping Waste from Water", Chemical Engineering, Dec. 1990, p. 15.
"Electro-Coagulation—Some Basic and Operating Characteristics", Donini et al, 11th International Coal Preparation Congress, Toyko, 1990, pp. 253–256.
"Alternating Current Electrocoagulation for Superfund Site Remediation", C. F. Farrell, presented at U.S. Environmental Protection Agency Seventeenth Annual RREL Hazardous Waste Research Symposium, Cincinnati, Ohio, Apr. 1991.

*Primary Examiner*—John Niebling
*Assistant Examiner*—William T. Leader
*Attorney, Agent, or Firm*—Hodgson, Russ, Andrews, Woods & Goodyear, LLP

[57] ABSTRACT

Apparatus and method for removing contaminants from an aqueous medium. The apparatus includes a fluidized bed of metallic particles through which the medium is flowed and through which an electric current is applied by electrodes for agglomerating contaminants in the medium. In order to allow the electrodes to be non-consumable so that they do not require frequent replacement, the particles are consumable.

7 Claims, 2 Drawing Sheets

U.S. Patent  Sep. 24, 1996  Sheet 2 of 2  5,558,755

METHOD FOR REMOVING CONTAMINANTS FROM AN AQUEOUS MEDIUM

This is a divisional of application Ser. No. 07/882,341 filed May 13, 1992, now U.S. Pat. No. 5,372,690.

The present invention relates generally to the removal of contaminants from an aqueous medium. More particularly, the present invention relates to electrochemical apparatus and method for agglomerating contaminants in an aqueous medium to effect their separation therefrom. This is meant to include co-precipitating soluble contaminants and oil-in-water emulsion breakage as well as solid-liquid separation.

Contaminants have been removed from wastewater or the like by flowing the water between a pair of sacrificial consumable electrodes such as aluminum electrodes in the presence of a fluidized bed of conductive attrition-resistant particles such as graphite, and passing an alternating current therethrough. Aluminum would be dissolved from the electrodes into the solution where it would affect the solids to cause coagulation thereof so that they could then be removed such as by skimming or settling. It is stated that the turbulence of the particles improves conductivity and current efficiency, minimizes electrode erosion, and provides a scrubbing action to minimize fouling or scaling of the electrodes. See, for example, U.S. Pat. No. 4,053,387 to Moeqlich et al. Also see U.S. Pat. Nos. 4,072,596; 4,094,755; 4,176,038; 4,131,526 to Moeqlich and 4,329,211 to Plantes et al. In addition, see U.S. Pat. Nos. 4,123,345 to Shettel; 2,130,789 to Campbell; 3,919,062 to Lundquist, Jr. et al; and 4,048,030 to Miller.; European patent document 341,614; and German patent document 3,723,745. Also see "An Electrochemical Way of Stripping Waste from Water" Chemical Engineering, December, 1990, at page 15, and "Electro-Coagulation - Some Basic and Operating Characteristics", by Donini et al, 11th International Coal Preparation Congress, Tokyo, 1990, at pages 253 to 256.

Consumable electrodes, which are expensive, require frequent labor-intensive replacement periodically, perhaps as often as every 3 months.

It is accordingly an object of the present invention to eliminate the requirement of frequent periodic replacement of the electrodes.

It is a further object of the present invention to provide increased aluminum or metallic dissolution into a solution so that heavy suspensions and emulsions may be effectively treated.

It is yet another object of the present invention to provide an apparatus for agglomerating solids in an aqueous medium which is low-maintenance, efficient, rugged, easy to use, and inexpensive.

In order to allow the electrodes to be non-consumable so that they do not require such frequent replacement, in accordance with the present invention an apparatus for removing contaminants in an aqueous medium includes a fluidized bed of consumable metallic particles through which the medium is flowed and through which an electric current is applied between the electrodes.

The above and other objects, features, and advantages of the present invention will be apparent in the following detailed description of the preferred embodiments when read in conjunction with the accompanying drawings wherein the same reference numeral denotes same or similar parts throughout the several views.

DETAILED DESCRIPTION OF THE PREFERRED EMBODIMENTS

Figures 1, 2, 3:
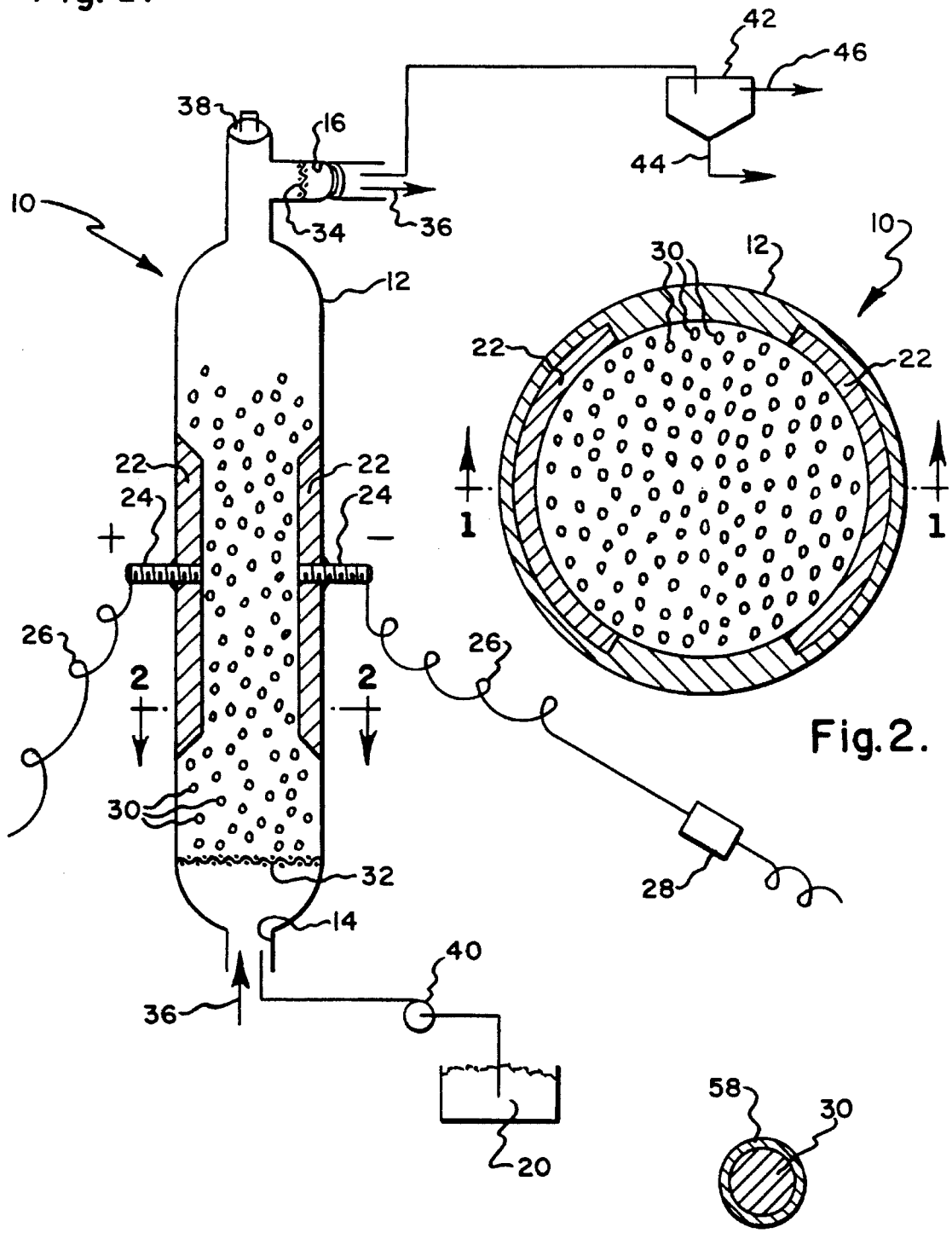
FIG. 1 is a vertical sectional view, partly schematic, taken along lines 1—1 of FIG. 2, of apparatus which embodies the present invention.
FIG. 2 is a sectional view, taken along lines 2—2 of FIG. 1, of the apparatus.
FIG. 3 is a sectional view of a fluidized bed particle for the apparatus of FIGS. 1 and 2.

Referring to FIGS. 1 and 2, there is shown generally at 10 apparatus for agglomerating solids suspended, and soluble pollutants entrained, in an aqueous medium, illustrated at 20. The apparatus 10 comprises a generally cylindrical elongate casing 12 composed of a suitable non-conductive material such as, for example, a 6 inch diameter schedule 80 PVC pipe or composed of fiberglass. The cell casing 12 can however be of any material or design that will contain aqueous solutions and of any geometric shape that will allow and contain upflow solution and bed fluidization between charged electrodes, as discussed hereinafter. The material should be chemically inert or corrosion-resistant, preferably non-conductive, although the casing may be composed of metal if proper insulation is applied. The casing 12 has an inlet 14 at one end and an outlet 16 at the other end for receiving the aqueous medium 20 to be treated and to discharge the medium. The aqueous medium 20 is flowed through the casing 12, as illustrated at 36, by means of a suitable pump 40 for treatment, as described hereinafter, and discharged to a suitable vented vessel, tank, or other apparatus such as vented clarifier 42 the purpose of which will be described hereinafter. It should be understood that more than one cell 12 may be connected in parallel or series.

A pair of spaced electrodes 22 are provided on opposite sides of the casing 12 so that the medium 20 may be flowed therebetween. The electrodes 22 are connected to the casing by suitable means such as, for example, threaded rods 24 which are installed to sealingly penetrate the casing wall and to which may be connected electrical wires 26 which are connected to an electrical power source, illustrated at 28, so that a circuit is completed by the discharge of electrical energy between the electrodes 22. A quantity of metallic particles 30 is maintained within the casing by a grating or screen 32 across the inlet 14 and another grating or screen 34 across the outlet 16. The screen size should be sufficient to contain the particles 30 but not so small that clogging is induced or fluid flow is otherwise unnecessarily impeded. A plug 38 is provided at the outlet to allow access to the casing 12 for maintenance thereof and for replenishment of the metallic particles 30, as discussed hereinafter. The screens should be installed to allow convenient access for removal or addition of bed material. Thus, as shown in FIG. 1, the screen 34 is installed in one fork of the outlet, and the plug 38 is installed in another fork which is closed by the plug.

As the fluid 20 is flowed through the casing 12, highly charged polymeric aluminum hydroxide species or other metallic hydroxide species are introduced into the fluid, as hereinafter discussed, to neutralize electrostatic charges on suspended solid and/or oil droplets to facilitate their agglomeration (or coagulation) and resultant separation from the aqueous phase. They will also prompt the co-precipitation of certain soluble ionic species such as metals and alkaline earths. Phase separation occurs at the clarifier 42 with the agglomerated solids falling to the bottom and being removed through an underflow line 44 to a filter press incinerator or other means for disposal thereof. The clarified liquid phase is removed through an overflow line 46 for use of the liquid or for its delivery to a sewer. Thus, apparatus 10 may have application in the fields of effluent remediation (removal of soluble and suspended pollutants), and in product recovery (capture for reuse of fine-grained product).

Metal hydroxide species for neutralizing electrostatic charges on suspended particles in a fluid have conventionally been provided by consumable metal electrodes wherein the metal is gradually dissolved into the fluid under the influence of an electric charge as the fluid is flowed thereby. Not only do the expensive consumable electrodes require close spacing of perhaps ½ inch so that more of them are required for a particular volume flow rate, but they must be replaced frequently, perhaps about every 3 months, which is a labor-intensive process. Furthermore, an oxide coating tends to build up on the electrodes resulting in reduced operating efficiency. This coating commonly originates from coagulated material which adheres to the electrodes or is baked on the electrode as a result of heat generated during electrocoagulation. In order to eliminate such frequent replacement of the electrodes, in accordance with the present invention particles 30 are consumable metallic particles such as, for example, aluminum pellets, which will dissolve under the influence of an electrical field between the electrodes 22 to produce charged metal ionic and hydroxyl species that act to treat wastewater or the like by destabilizing emulsions and suspensions, co-precipitating various ions, and increasing the mean size of the particle aggregate. The particles 30 are of a suitable density that, in combination with the flow rate of the medium 20 through the casing 12, a fluidized bed of the particles is provided allowing electrical discharge throughout the volume of fluid between the electrodes and with dispersal of the metal ionic and hydroxyl species throughout the fluid for effective agglomeration. If desired, compressed air may be introduced into the casing 12 to assist in maintaining the turbulent fluidized bed and enhancing the aluminum dissolution efficiency by increasing the anodic surface area. Charge neutralization is initiated within the electrocoagulation cell 12 and continues following discharge of the aqueous medium 20 from the apparatus.

The use of the consumable particles 30 allows the electrodes 22 to be non-consumable so that frequent periodic replacement thereof is advantageously not required and efficiency reducing oxide build-up on the electrodes may advantageously be reduced. Instead of perhaps every 3 months continuous use for replacement of consumable electrodes in conventional apparatus, the non-consumable electrodes allowed by the present invention may be permanently installed, i.e., for a period of perhaps 5 years or more of continuous use without replacement. The cost of the pellets, i.e., recycled beads or metal turnings or the like (perhaps $0.75 per pound of high purity aluminum) may generally be less than the cost of manufactured electrodes (perhaps $2.00 per pound), and the pellets are merely added whereas the electrodes require labor intensive replacement. Thus, the use of consumable pellets allows lower operating and maintenance cost.

The electrodes may be composed of any suitable electrically conductive substance, preferably a non-consumable metal, and more preferably corrosion-resistant alloys or noble metals. As used herein and in the claims, the term "non-consumable" refers to a chemically inactive material which, under the influence of an electric charge, remains chemically stable so as to be resistant to dissolution. Examples of non-consumable materials include, but are not limited to, stainless steel (even though some iron may leach out), tantalum, tungsten; titanium, carbon, graphite, copper, silver, platinum, and other noble metals. The term "non-consumable" also includes a layer of such a material over a consumable material whereby the consumable material is not exposed and therefore not consumed during the process. Non-consumable materials may be in a matrix form. Non-consumable electrodes do not provide the metal ionic and hydroxyl species in sufficient quantities for effective agglomerization. When non-consumable electrodes are used, the species must be provided by the pellets 30.

Figure 6:
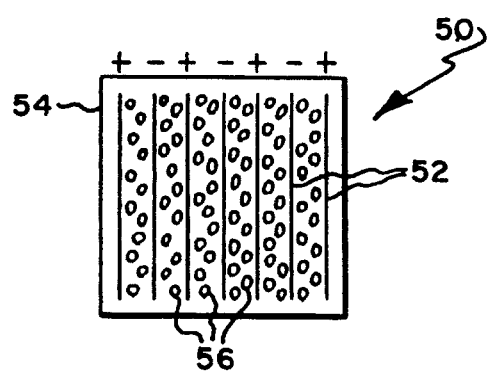
FIG. 6 is a schematic view illustrating an alternate arrangement of electrodes in the apparatus.

The electrodes 22 are shown in FIG. 2 to be hemispherical so as to maximize the surface area thereof, and are disposed in recesses in the wall of the casing 12. However, the electrodes may be otherwise suitably shaped. For example, the electrodes may be rectilinear, have the shape of rods or screening, or have any other suitable shape or geometry including concentric that will allow a fluidized bed between alternately charged electrodes. Referring to FIG. 6, there is shown an alternate embodiment of the present invention wherein an apparatus 50 is similar to apparatus 10 except that it has a plurality of alternately charged electrodes 52 connected in series across the casing 54 thereof with the fluidized bed of particles 56 between and among the electrodes 52. The electrodes 52 may be said to be in a "plate pack" wherein the side-by-side electrodes allow an increased cross-sectional area for use with a low conductivity medium 20. For another example, the electrodes may comprise rods which are adjustably inserted into the medium 20 within a casing so that the electrode surface area presented to the medium can be varied depending upon the conductivity thereof.

The fluidized bed particles 30 may be any consumable metallic pieces, turnings, particles, or shot of any suitable size or geometry, which is consumable, preferably spherical shot, more preferably an aluminum or ferrous alloy. As used herein and in the claims, the term "consumable" refers to a chemically active metal which, under the influence of an electric charge through an aqueous solution, oxidizes and introduces ions which form charged species such as ionic and hydroxyl species which are provided at a sufficient rate to effectively destabilize suspensions or emulsions to cause phase separation. The consumable metal is not chemically stable but is instead used up in the process. Examples of consumable metals include, but are not limited to, steel, aluminum, and magnesium. This is in contrast to materials such as charcoal, alumina (a crystalline form of aluminum oxide or hydroxide) perlite, and ceramic material which are not consumable.

Typically, consumable electrodes may require replacement after about every 3 months of continuous use whereas stainless steel or other suitable non-consumable electrodes of the present invention may not require replacement for at least about 5 years continuous use with alternating current. The electric source 83 is preferably a source of alternating current so as to allow the constantly changing polarities to provide a "scrubbing" action for cleaning thereof and so as to prevent a build-up of rust which might necessitate more frequent electrode replacement if direct current is used.

These replacement times will vary somewhat depending upon the type of material in solution since some materials may attack the metal in the electrodes or in the pellets more aggressively than other materials may attack. In contrast to conventional monopolar systems that may require a low voltage of perhaps 20 to 60 volts to operate at a high current of perhaps 500 to 1,000 amperes, apparatus according to the present invention may preferably operate at a high voltage of perhaps 60 to 440 volts, more preferably about 120 volts, and a low amperage of perhaps 5 to 50 amperes whereby expensive step-down transformers are not required with the result that the cost of the apparatus may be reduced.

The use of non-consumable electrodes with the consumable pellets of the present invention also allows the electrodes to be spaced further apart, spacing between the electrodes 22 being dependent on conductivity of the solution and the amperage. For example, at currents in the 5 to 50 ampere range, for higher conductivity solutions on the order of 15,000 micromhos/cm, the electrode spacing may typically be between about 2 and 3 inches and the positive electrode or electrodes may be sized to present an active surface area of perhaps about 20 square inches, the negative electrode or electrodes presenting a similar active surface area. For lower conductivities on the order to 300 micromhos/cm, the electrode spacing may be perhaps about 1 to 2 inches, and the positive electrode or electrodes may be sized to present an active surface area of perhaps about 90 square inches.

During the oxidation process resulting in dissolution of the consumable particles 30 into solution, there is a corresponding reduction of hydronium ions in the solution producing hydrogen gas. This finally sparged hydrogen gas produced in the cell may promote flotation of the coagulated solids for improved phase separation. This hydrogen gas may be vented to the atmosphere following discharge of the electrocoagulated solution from the cell to the clarifier, flotation chamber, or settling tank, etc.

In order to generate the polymeric ionic and hydroxyl species for charge neutralization of particles or soluble contamination in the medium, the current flow between the electrodes 22 makes charge contact with the metallic particles 30. Without wishing to be bound by theory here or elsewhere in this application, it is believed that under the influence of the electric field, the beads 30 become polarized with anodic and cathodic charges on each with the various current paths between the electrodes passing through the beads. As a result, an oxide layer may tend to build up on the beads. Chloride or other halide ions in solution may penetrate this layer to allow charge transfer and dissolution of the particles. Advantageously, the typical solution to be treated has sufficient chloride concentration. The amount of chloride in normal tap water is considered to be generally sufficient.

Metallic particles even with a thin oxide build-up thereon in contact with the electrodes may undesirably result in electrical shorting. Referring to FIG. 3, in order to prevent such an electrical short from occurring, the pellets 30 are pretreated with a coating 58 such as, for example, aluminum oxide of a suitable thickness to provide adequate insulation. The chloride or halide ions in the solution may still penetrate the oxide coating 58 to achieve the required charge transfer and particle dissolution. The coated particles are preferably obtained by immersing them in hydrochloric acid for several hours after which the excess solution is rinsed off, the length of immersion being such as to provide a coating of sufficient thickness to prevent electrical arcing. Aluminum chloride is created during the reaction of the pellets with the acid. Aluminum chloride is unstable in the solution and forms aluminum oxide which coats the pellets. An equilibrium is reached which allows a suitable aluminum oxide coating which is in contrast to the use of sulphuric or nitric acid wherein the equilibrium conditions are such that an inadequate oxide coating may be formed. In order to enhance the equilibrium conditions, some aluminum may be dissolved in the hydrochloric acid before treatment so that the process may begin with some aluminum chloride already present.

The following is an example of the procedure for pretreatment of the particles, the example being provided for purposes of illustration and not for purposes of limitation. To a 5-gallon aliquot of +8 to −16 mesh (average 3/32 inch diameter) aluminum pellets are added 100 milliliters of concentrated hydrochloric acid per 40 pounds of pellets. The pellets are continually agitated and stirred for perhaps 30 minutes. A liter of tapwater is thereafter added to slow the oxidation reaction, and the pellets are allowed to stand for approximately 12 hours in this solution. The pellets are then thoroughly rinsed with tap water and can be placed into the electrocoagulation cells.

Figure 4:
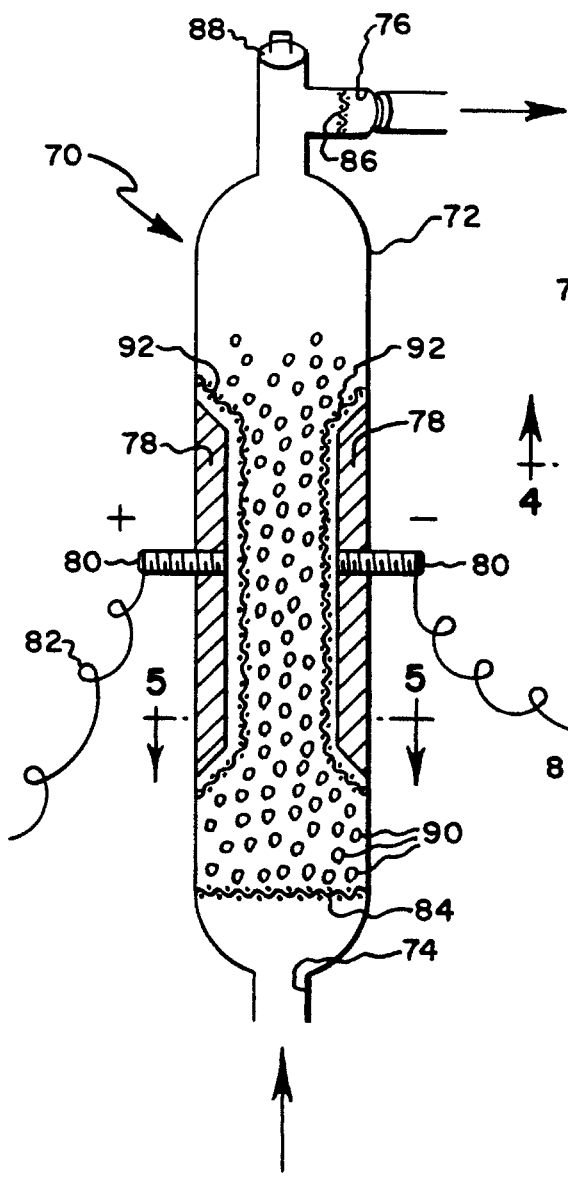
FIG. 4 is a view similar to that of FIG. 1 and taken along lines 4—4 of FIG. 5, of an alternate embodiment of the present invention.
Figure 5:
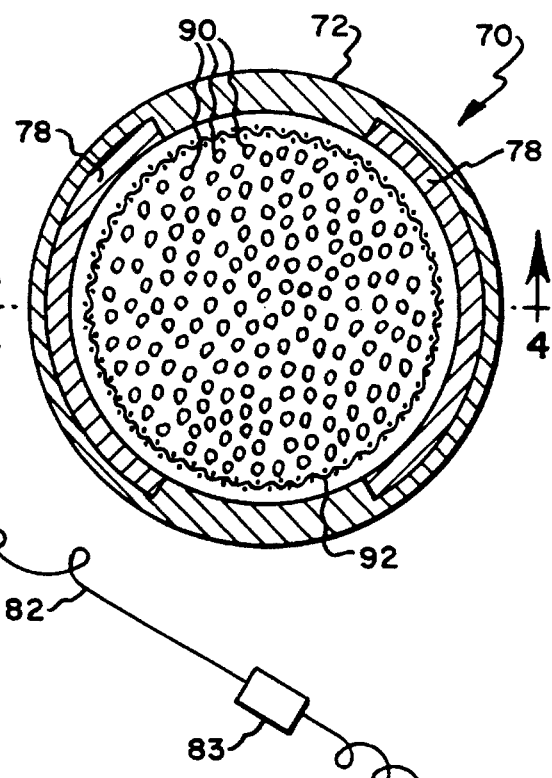
FIG. 5 is a sectional view of the apparatus of FIG. 4 taken along lines 5—5 thereof.

Referring to FIGS. 4 and 5, there is shown an alternate embodiment of the present invention. The apparatus, illustrated at 70 thereof, includes a casing 72, an inlet 74, an outlet 76, electrodes 78, threaded connectors 80, wires 82, an electrical source 83, an inlet screen 84, an outlet screen 86, a plug 88, a pump (not shown), and a clarifier (not shown) which may be similar to the casing 12, inlet 14, outlet 16, electrodes 22, threaded connectors 24, wires 26, electric source 28, inlet screen 32, outlet screen 34, plug 38, pump 40, and clarifier 42 of the embodiment of FIGS. 1 and 2. The casing 72 also contains a fluidized bed of metallic particles 90 which are similar to the particles 30 except that they need not have an insulative coating thereon. In order to prevent bridging contact with the electrodes 78 resulting in an electrical short, a barrier illustrated schematically at 92 is provided between one or both of the electrodes 78 and the particles 90. This separator barrier 92 may suitably be in the form of a screen of non-conductive material with pores small enough to prevent passage of the particles 90 but which are large enough to minimize the resistance to fluid flow thereacross and to allow ionic mobility and charge transfer. Other suitable barrier materials include porous cloth or sponge or salt bridge construction. The screen 92 is suitably attached to the casing 72.

If it is desirable to provide a screen between the electrodes 22 and particles 30 of the apparatus of FIGS. 1 and 2, it is preferred that the screen be composed of a conductive material and be attached to the electrode or electrodes so as to reduce the electrical resistance occasioned thereby.

The greater surface area which may be provided by the low cost pellets, as compared to the use of consumable electrodes, may also result in a larger amount of ionic and hydroxyl species being generated for interaction with the solids in the medium so that heavier suspensions and emulsions may be treated effectively. Thus, the use of the consumable aluminum pellets may result in generation of perhaps 5 to 10 times the theoretical Faraday's Law amount of aluminum as compared to merely 1/3 to 1/2 of the theoretical Faraday's Law amount of aluminum with the use of consumable aluminum electrodes in conventional monopolar alternating current apparatus. For example, consumable aluminum pellets may allow the generation of 25 to 50 mg Al/amp-min as compared to perhaps 2 mg Al/amp-min with the use of the consumable electrodes of conventional monopolar alternating current apparatus.

Sight ports may, if desired be installed in the electrocoagulation cell walls to permit viewing of the level of the pellets. When the level falls below a certain level, all that would be required is to merely unscrew the top plug 38, pour in the pellets to the desired level (by looking through the appropriate sight port), and secure the plug. This is an advantageously simpler and less expensive procedure than disassembling a cell to replace expensive consumable electrodes.

Electrocoagulation operating conditions are dependent upon the chemistry of the aqueous medium 20 and the conductivity, pH, and chloride ion concentration therein. The treatment rate of the aqueous medium 20 through the electrocoagulation cell 12 is dependent both on the solution chemistry (conductivity), the nature of the entrained suspension or emulsion, and the extent of electrocoagulation required to achieve the treatment. The following is an example of apparatus which may be provided in accordance with the present invention, the example being provided for purposes of illustration and not for purposes of limitation. Alternating current electrocoagulation may be used to treat a pigment-bearing overflow stream from a clarifier to recover the fine-grained (0.3 micron diameter) $TiO_2$ that is being lost to a disposal lagoon. The clarifier may receive filtrate from the final rotary vacuum drum filter stage of production of high-purity $TiO_2$; the clarifier is used to recover as much as possible of the fine-grained $TiO_2$ that passes through the filters (<0.5 microns) through gravity settling over a 12 hour residence time. A portable skid-mounted alternating current electrocoagulation unit with a nominal throughput capacity of 70 gpm may be used. The apparatus may contain 4 electrocoagulation cells manufactured from 4-inch diameter 36-inch high Schedule 80 PVC pipes, a self-priming, close-coupled centrifugal pump, supporting piping and valving, a 24 KVA transformer, and an electrical control panel. Within each electrocoagulation cell may be installed two electrodes (316 stainless steel which may be silver electroplated), each 2 inches in width and 14 inches in length, installed on diametrically opposed sides of the cell. Two threaded 0.5-inch diameter stainless steel bolts may be welded to the back of each electrode and extend through the PVC wall of the electrocoagulation cell to enable electrical connections to be made. The 4 PVC pipes may be oriented vertically and the clarifier overflow stream to be electrocoagulated may be pumped in an upflow manner through the cells. At the base and top of each cell may be installed perforated plastic screens (nominal openings 0.05 inches) to contain the fluidized bed aluminum pellets within the electrocoagulation cells. At the top of each electrocoagulation cell may be installed a 6.5-inch segment of clear PVC to enable fluidization of the aluminum bed to be viewed when the electrocoagulation cell is in operation and to determine when replenishment of the aluminum pellets is required. PVC valving enables from 1 to 4 electrocoagulation cells to be used; although the centrifugal pump may have but one pumping rate (99 gpm at 10-feet Total Head), use of a by-pass line to divert a portion of the pump discharge back to the untreated overflow reservoir enables the solution throughput rate to be reduced and any number of electrocoagulation cells to be operated. Compressed air can be injected into the effluent feed line at the base of each electrocoagulation cell (immediately below the basal perforated plastic screen) to assist in creating turbulence within the cell or in improving the pellet dissolution rate. Switching within the electrical control panel permits electrical power to be applied to the electrocoagulation cells at 5 distinct potentials: 60 VAC, 90 VAC, 120 VAC, 135 VAC, and 160 VAC. The maximum current that can be driven in each electrocoagulation cell is limited to 90 amperes. The influent overflow stream from the clarifier may have the following characteristics: approximately 20–28 mg/l aluminum, a conductivity of 1,650 S/cm, an initial temperature of 25° C., a $TiO_2$ content of 850 mg/l, and a turbidity in excess of 1,000 NTU. Electrocoagulation of this stream through 4 electrocoagulation cells at a rate of 55 gpm with 160 VAC applied to each cell enables from 11 to 13 amperes electrical current to be passed through each cell. Approximately 8 to 10 psig of compressed air may be introduced into the base of each electrocoagulation cell. The electrocoagulated stream may be discharged to a settling tank to provide the necessary residence time to permit separation of the coagulated $TiO_2$ from the aqueous medium. After 10 minutes of settling, for example, the total suspended solids content of the supernate phase may be reduced from 850 mg/l to 2 to 3.5 mg/l and the turbidity to 50 to 65 NTU. Treatment may entail addition of approximately 100 to 150 mg/l aluminum. The settled, coagulated $TiO_2$ could be collected for reuse and the clarified supernate phase could be discharged to the municipal sewer system generally without imposition of discharge penalties. For typical commercial applications the capacity would of course have to be increased.

It is to be understood that the invention is by no means limited to the specific embodiments which have been illustrated and described herein, and that various modifications thereof may indeed be made which come within the scope of the present invention as defined by the appended claims.

What is claimed is:

1. A method for removing contaminants from an aqueous medium comprising the steps of:
   a. providing a chamber having at least one pair of electrodes;
   b. providing a fluidizable bed of metallic particles in the chamber between the electrodes;
   c. flowing the medium through the bed thereby fluidizing the bed;
   d. applying an electric current between the electrodes to effect dissolution of the metallic particles thereby introducing ions which effect agglomeration of the contaminants; and
   e. removing the agglomerated contaminants from the medium after the medium has flowed out of the chamber.

2. A method according to claim 1 further comprising providing a barrier between the electrodes and metallic particles to prevent contact between the electrodes and metallic particles thereby to prevent electrical shorting between the electrodes and metallic particles and to allow ionic mobility and charge transfer and further comprising selecting the barrier to be a screen.

3. A method according to claim 1 further comprising selecting the metallic particles to have an insulative coating.

4. A method according to claim 1 further comprising selecting the electrodes to be composed of a material selected from the group consisting of stainless steel, tantalum, tungsten, titanium, carbon, graphite, copper, and the noble metals.

5. A method according to claim 1 further comprising applying an alternating current between the electrodes.

6. A method according to claim 1 further comprising selecting the metallic particles to be composed of a material selected from the group consisting of steel, magnesium, and aluminum.

7. A method for agglomerating contaminants in an aqueous medium comprising the steps of:
   a. providing at least one pair of electrodes;

b. providing a fluidizable bed of metallic particles between the electrodes;

c. flowing the medium through the bed thereby fluidizing the bed; and d. applying an electric current between the electrodes to effect dissolution of the metallic particles thereby introducing ions to effect agglomeration of the contaminants, the method further comprising providing a barrier between the electrodes and metallic particles to prevent contact between the electrodes and metallic particles thereby to prevent electrical shorting between the electrodes and metallic particles, and selecting the barrier to be a screen.

* * * * *